United States Patent
Hafeez et al.

(10) Patent No.: US 10,887,890 B2
(45) Date of Patent: Jan. 5, 2021

(54) FAST MULTI-BEAM LISTEN BEFORE TALK

(71) Applicant: AT&T Intellectual Property I, L.P., Atlanta, GA (US)

(72) Inventors: Abdulrauf Hafeez, Cary, NC (US); Thomas Novlan, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 64 days.

(21) Appl. No.: 16/277,707

(22) Filed: Feb. 15, 2019

(65) Prior Publication Data

US 2020/0267736 A1  Aug. 20, 2020

(51) Int. Cl.
| | |
|---|---|
| *H04W 74/08* | (2009.01) |
| *H04W 72/08* | (2009.01) |
| *H04B 7/0404* | (2017.01) |
| *H04W 74/02* | (2009.01) |
| *H04W 72/04* | (2009.01) |
| *H04W 72/12* | (2009.01) |

(52) U.S. Cl.
CPC ........ *H04W 72/082* (2013.01); *H04B 7/0404* (2013.01); *H04W 72/0446* (2013.01); *H04W 72/121* (2013.01); *H04W 74/02* (2013.01)

(58) Field of Classification Search
CPC .............................. H04W 52/40; H04W 36/22
See application file for complete search history.

(56) References Cited

U.S. PATENT DOCUMENTS

| | | |
|---|---|---|
| 6,980,023 B1 | 12/2005 | Wong et al. |
| 8,086,239 B2 | 12/2011 | Elmaleh |
| 8,619,805 B2 | 12/2013 | Flammer |
| 9,730,220 B2 | 8/2017 | Bhorkar et al. |
| 9,888,389 B2 | 2/2018 | Bendlin |

(Continued)

FOREIGN PATENT DOCUMENTS

| | | |
|---|---|---|
| WO | 2016048798 A1 | 3/2016 |
| WO | 2016072908 A1 | 5/2016 |

(Continued)

OTHER PUBLICATIONS

Nekovee, et al. "Self-organized beam scheduling as an enabler for coexistence in 5G unlicensed bands." IEICE Transactions on Communications 100.8 (2017): 1181-1189.

(Continued)

*Primary Examiner* — Zhiren Qin
(74) *Attorney, Agent, or Firm* — Amin, Turocy & Watson, LLP

(57) ABSTRACT

Facilitating fast multi-beam listen before talk in advanced networks (e.g., 4G, 5G, 6G, and beyond) is provided herein. Operations of a device can comprise determining a first inactivity in a first beam based on a first performance of a first listen before talk procedure in the first beam and, based on determining the first inactivity, analyzing a presence of an activity in a second beam based on a second performance of a second listen before talk procedure in the second beam. Further, the operations can comprise, based on determining a lack of the presence of the activity in the second beam, transmitting a signal via the second beam. In an example, analyzing the presence of the activity in the second beam can be performed prior to completion of the determining the first inactivity in the first beam.

20 Claims, 10 Drawing Sheets

(56) References Cited

U.S. PATENT DOCUMENTS

| | | | |
|---|---|---|---|
| 9,924,511 | B2 | 3/2018 | Tavildar et al. |
| 10,142,986 | B2 | 11/2018 | Yu |
| 10,462,820 | B2 * | 10/2019 | Shi ................ H04W 16/28 |
| 2005/0052950 | A1 | 3/2005 | Klinnert et al. |
| 2013/0003803 | A1 | 1/2013 | Ferguson |
| 2016/0143014 | A1 | 5/2016 | Mukherjee et al. |
| 2016/0174258 | A1 | 6/2016 | Wang et al. |
| 2016/0174259 | A1 | 6/2016 | Mukherjee et al. |
| 2016/0278125 | A1 | 9/2016 | Liao |
| 2016/0373940 | A1 | 12/2016 | Splitz et al. |
| 2016/0381707 | A1 | 12/2016 | Figueiredo et al. |
| 2017/0019909 | A1 | 1/2017 | Si |
| 2017/0079032 | A1 | 3/2017 | Li et al. |
| 2017/0094681 | A1 | 3/2017 | Takeda et al. |
| 2017/0188387 | A1 | 6/2017 | Mukherjee et al. |
| 2017/0202022 | A1 | 7/2017 | Chendamarai et al. |
| 2017/0223635 | A1 | 8/2017 | Dinan |
| 2017/0231003 | A1 | 8/2017 | Godana et al. |
| 2017/0265214 | A1 | 9/2017 | Hessler et al. |
| 2017/0325263 | A1 | 11/2017 | Liu et al. |
| 2018/0054835 | A1 | 2/2018 | Fodor et al. |
| 2018/0063799 | A1 | 3/2018 | Sadek |
| 2018/0092043 | A1 | 3/2018 | Yerramalli et al. |
| 2018/0092121 | A1 | 3/2018 | Hessler et al. |
| 2018/0103386 | A1 | 4/2018 | Harada |
| 2018/0109957 | A1 | 4/2018 | Fan |
| 2018/0115996 | A1 | 4/2018 | Si et al. |
| 2018/0132236 | A1 | 5/2018 | Kadous |
| 2018/0139782 | A1 | 5/2018 | Sadek |
| 2018/0160452 | A1 | 6/2018 | Patil |
| 2018/0176787 | A1 | 6/2018 | Fakoorian |
| 2018/0184302 | A1 | 6/2018 | Zhang |
| 2018/0184457 | A1 | 6/2018 | Islam et al. |
| 2018/0206127 | A1 | 7/2018 | Zhang |
| 2018/0213560 | A1 | 7/2018 | Naghshvar et al. |
| 2018/0235010 | A1 | 8/2018 | Harada |
| 2018/0241526 | A1 | 8/2018 | Chendamarai |
| 2018/0242232 | A1 | 8/2018 | Chendamarai |
| 2018/0288625 | A1 | 10/2018 | Chandrasekhar |
| 2018/0309479 | A1 | 10/2018 | Yerramalli |
| 2018/0343588 | A1 | 11/2018 | Sadek |
| 2018/0343676 | A1 | 11/2018 | Yerramalli |
| 2018/0352520 | A1 | 12/2018 | Zhang et al. |
| 2019/0373635 | A1 * | 12/2019 | Yang ................ H04B 7/0408 |
| 2020/0037366 | A1 * | 1/2020 | Cui ................ H04B 7/0695 |

FOREIGN PATENT DOCUMENTS

| | | |
|---|---|---|
| WO | 2016197315 A1 | 12/2016 |
| WO | 2017020243 A1 | 2/2017 |
| WO | 2017121460 A1 | 7/2017 |
| WO | 2017173133 A1 | 10/2017 |
| WO | 2017191617 A1 | 11/2017 |
| WO | 2017191939 A1 | 11/2017 |
| WO | 2017220237 A1 | 12/2017 |
| WO | 2018059512 A1 | 4/2018 |
| WO | 2018067226 A1 | 4/2018 |

OTHER PUBLICATIONS

Song, et al. "Coexistence of Wi-Fi and cellular with listen-before-talk in unlicensed spectrum." IEEE Communications Letters 20.1 (2016): 161-164.

Chen, et al. "Downlink performance analysis of LTE and WiFi coexistence in unlicensed bands with a simple listenbefore—talk scheme." Vehicular Technology Conference (VTC Spring), 2015 IEEE 81st, 2015.

Li, Yuan, Juan Zheng, and Qiang Li. "Enhanced listen-before-talk scheme for frequency reuse of licensed-assisted access using LTE." Personal, Indoor, and Mobile Radio Communications (PIMRC), 2015 IEEE 26th Annual International Symposium, 2015.

Ko, et al. "A fair listen-before-talk algorithm for coexistence of LTE-U and WLAN." IEEE Transactions on Vehicular Technology 65.12 (2016): 10116-10120.

Jeon, et al. "LTE with listen-before-talk in unlicensed spectrum." Communication Workshop (ICCW), 2015 IEEE International Conference, 2015.

Kim, et al. "Adaptive listen-before-talk (LBT) scheme for LTE and Wi-Fi systems coexisting in unlicensed band." Consumer Communications & Networking Conference (CCNC), 2016 13th IEEE Annual, 2016.

3GPP, "3rd Generation Partnership Project; Technical Specification Group Radio Access Network; Study on Licensed-Assisted Access to Unlicensed Spectrum; (Release 13)," 3GPP TR 36.889 V0.0.2 (Oct. 2014), 9 pages.

Office Action dated May 15, 2019 for U.S. Appl. No. 15/868,735, 13 pages.

Office Action dated Feb. 5, 2019 for U.S. Appl. No. 15/868,735, 21 pages.

Na et al. "Coexistence scheme of licensed-assisted access using long-term evolution and wireless local area network for wireless sensor networks" International Journal of Distributed Sensor Networks 13.6 (2017): 1550147717716814. 10 pages.

Qualcomm. "What can we do with 5G NR Spectrum Sharing that isn't possible today?" Qualcomm Technologies, Inc., qualcomm.com, Dec. 13, 2017. 33 pages.

Bae, et al. "Towards Harmonious Coexistence in the Unlicensed Spectrum: Rational Cooperation of Operators" Sensors 17.10 (2017): 2432. 13 pages.

Non-Final Office Action received for U.S. Appl. No. 15/868,735 dated Jan. 2, 2020, 13 pages.

Non-Final Office Action received for U.S. Appl. No. 15/868,735 dated Sep. 16, 2019, 18 pages.

* cited by examiner

FAST MULTI-BEAM LISTEN BEFORE TALK

TECHNICAL FIELD

This disclosure relates generally to the field of wireless communication and, more specifically, to accessing unlicensed shared spectrum in wireless communication systems for advanced networks (e.g., 4G, 5G, 6G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) and/or Sixth Generation (6G) standard for wireless communications. Unique challenges exist to provide levels of service associated with forthcoming 5G, 6G, and/or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
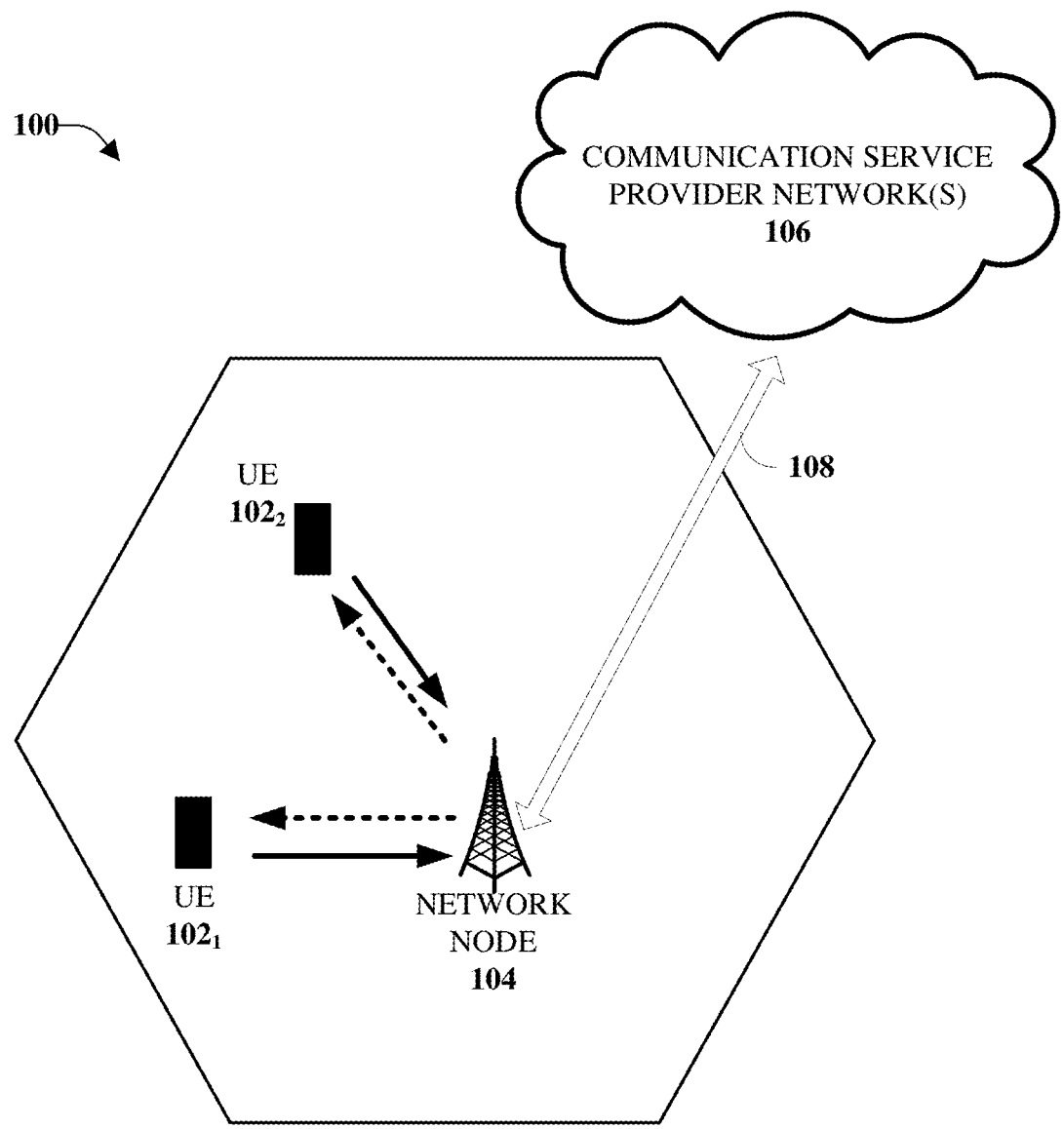
FIG. 1 illustrates an example, non-limiting, wireless communication system in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are devices, systems, methods, articles of manufacture, and other embodiments or implementations that can facilitate fast listen before talk in advanced networks. Listen before talk is a coexistence mechanism used by wireless technologies, such as Wi-Fi, to access unlicensed shared spectrum, such as the Industrial, Scientific and Medical (ISM) radio band and/or Unlicensed National Information Infrastructure radio band (5 GHz). A form of listen before talk is required by regulation in some countries and regions, such as Europe and Japan. In the United States, although listen before talk is not required by regulation, it is used by Wi-Fi and LTE License Assisted Access (LAA) for coexistence purposes. As a coexistence mechanism listen before talk can be improved significantly with transmit and receive beamforming. 5G systems, especially for mmWave spectrum, will have a large number of antenna elements which could be used for analog, digital, and/or hybrid beamforming. With Time Division Duplex (TDD) transmission, every transmit beam has a corresponding receive beam with identical characteristics. Using this property, a transceiver can tell if other users are active on some beams but not on other beams. This allows the transceiver to use the inactive beams for its transmissions, thus increasing channel reuse efficiency without causing interference. The disclosed aspects provide novel ways to find inactive beams quickly, thereby decreasing channel access latency and increasing user throughputs and network capacity. The various aspects discussed herein can also be used for 5G random access using licensed spectrum and/or other advanced networks.

In one embodiment, described herein is a method that can comprise detecting, by a network device of a group of network devices, a first inactivity on a first beam. The first inactivity can indicate a first absence of first radio interference on the first beam. Detecting the first inactivity can be performed for a first interval. The method can also comprise detecting, by the network device, a second inactivity on a second beam for a second interval, shorter than the first interval. The second inactivity can indicate a second absence of second radio interference on the second beam. The method can also comprise in response to the detecting the second inactivity on the second beam, facilitating, by the network device, a transmission of a signal via the second beam. Further, the network device can comprise a processor.

In an example, detecting the first inactivity can comprise performing, by the network device, a listen before talk procedure in the first beam. Further to this example, detecting the second inactivity can comprise initiating, by the network device, a shortened listen before talk procedure in the second beam upon completion of the listen before talk procedure in the first beam. Alternatively, detecting the second inactivity can comprise initiating a shortened listen before talk procedure in the second beam before completion of the listen before talk procedure in the first beam.

In some implementations, facilitating the transmission of the signal can comprise facilitating the transmission of the signal to a single user device. Alternatively, facilitating the transmission of the signal can comprise facilitating the transmission of the signal to a group of user devices.

Multi-channel operation can be facilitated according to some implementations. For example, the multi-channel operation can be facilitated based on use of a shortened listen before talk procedure for a second channel and the second beam.

In some implementations, the method can comprise additionally detecting, by the network device, an n-th inactivity on an n-th beam for an n-th interval, shorter than the first interval. The n-th inactivity can indicate an n-th absence of an n-th radio interference on the n-th beam. Further, in response to detecting the n-th inactivity on the n-th beam, the method can comprise facilitating, by the network device, a second transmission of a second signal via the n-th beam.

According to some implementations, the method can comprise, after detecting the second inactivity, suspending, by the network device, a search for an activity on an n-th beam. Suspending the search can comprise mitigating an amount of network traffic congestion in a communications network.

In some implementations, detecting the first inactivity can comprise determining an interference direction based on a coarse scanning with the first beam. The first beam can be a broad beam and the second beam can be a narrow beam. In some cases, the first beam can be a primary beam, and the second beam can be a secondary beam. Further, the first beam can be a narrow beam and the second beam can be a broad beam.

According to some implementations, facilitating the transmission of the signal via the second beam can comprise facilitating the transmission of the signal via a spatial channel configured to operate according to a fifth generation wireless network communication protocol.

Another embodiment relates to a device that can comprise a processor and a memory that stores executable instructions that, when executed by the processor, facilitate performance of operations. The operations can comprise determining a first inactivity in a first beam based on a first performance of a first listen before talk procedure in the first beam. The first inactivity can indicate an absence of first radio interference on the first beam. Further, the first listen before talk procedure can comprise a first duration. The operations can also comprise based on determining the first inactivity, analyzing a presence of an activity in a second beam based on a second performance of a second listen before talk procedure in the second beam. The second listen before talk procedure can comprise a second duration shorter than the first duration. Further, the operations can comprise based on determining a lack of the presence of the activity in the second beam, transmitting a signal via the second beam. In an example, analyzing the presence of the activity in the second beam can be performed prior to completion of the determining the first inactivity in the first beam.

In some implementations, the operations can comprise, based on determining the lack of the presence of the inactivity, temporarily suspending additional searches for activities on additional beams other than the first beam and the second beam. Further to these implementations, the first beam can be a broad beam based on a synchronization signal block and the second beam can be a narrow beam based on a channel state information resource signal. The operations can comprise performing beam refinement comprising detecting a first direction of interference based on a coarse scan of first radio interference during the first listen before talk procedure performed on the broad beam. Further, transmitting the signal via the narrow beam can comprise transmitting the signal via the second beam in a second direction different from the first direction of interference. Alternatively, or additionally, transmitting the signal via the second beam can comprise transmitting the signal via a spatial channel configured to operate according to a fifth generation wireless network communication protocol.

Another embodiment relates to a machine-readable storage medium, comprising executable instructions that, when executed by a processor of a mobile device, facilitate performance of operations. The operations can comprise determining a first inactivity on a first beam based on a first detection procedure performed over a first time interval. The first inactivity can indicate a first absence of first radio interference on the first beam. The operations can also comprise, in response to determining the first inactivity, determining a second inactivity on a second beam based on a second detection procedure performed over a second time interval. The second time interval can be shorter than the first time interval, and the second inactivity can indicate a second absence of second radio interference on the second beam. The operations can also comprise using the first beam to transmit a first signal via a first spatial channel and the second beam to transmit a signal via a second spatial channel In an example, determining the second inactivity on the second beam can be initiated prior to a completion of the first detection procedure.

In some implementations, the operations can comprise, after the determining the second inactivity on the second beam, temporarily suspending additional detection procedures performed on additional beams, other than the first beam and the second beam.

In further detail, Wi-Fi and LTE LAA use listen before talk to determine if one or more unlicensed band channels are clear for transmission. For example, 5G systems, equipped with a large number of antennas elements, can perform listen before talk in multiple beams (e.g., directions) to determine which beams are inactive and use the inactive beams for transmission. In this case, a transmitting node (e.g., a network device, a base station, and so on) has to perform a full listen before talk procedure on each intended beam or direction on which transmission is desired. Searching for inactive beams can result in high latency and computational overhead if the number of beams is large.

The procedure becomes even more problematic if the transmitting node wants to use multiple beams for transmission. After discovery of a first inactive beam, searching for additional beams can have several unwanted consequences. The first beam may become active (e.g., occupied by another user if the first beam is not used soon). A reservation signal can be transmitted to keep the first beam from being occupied. This signal, however, can interfere with listening for additional beams. Even if additional beams were found and used for transmission along with the first beam, the time spent looking for additional beams means that there is an impact on latency and throughputs. Therefore, looking for additional beams for transmission may not always pay off in the end. This becomes even more problematic when the transmitting node wants to transmit to multiple users using Multiuser Multiple Input, Multiple Output (Mu-MIMO). The chances of finding multiple inactive beams for concurrent transmission to multiple users diminishes greatly as the time required to sense activity increases.

Various benefits can be achieved with the disclosed aspects. For example, the disclosed aspects can allow future networks to coexist well with on other in a shared spectrum. Further, the disclosed aspects can enable lower latency, higher capacity, and better user experience. Further, the various aspects discussed herein can allow for an efficient random access procedure in licensed spectrum for 5G radio and/or other advanced networks.

Referring now to FIG. 1, illustrated is an example, non-limiting, wireless communication system 100 in accordance with one or more embodiments described herein. In one or more embodiments, the wireless communication system 100 can comprise one or more user equipment devices (UEs), illustrated as a first UE $102_1$, a second UE $102_2$. It is noted that although only two UEs are illustrated for purposes of simplicity, the wireless communication system 100 can comprise a multitude of UEs. The non-limiting term user equipment can refer to any type of device that can communicate with a network node in a cellular or mobile communication system. A UE can comprise one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment (e.g., the first UE $102_1$, the second UE $102_2$) can also comprise Internet of Things (IOT) devices that communicate wirelessly.

In various embodiments, the wireless communication system 100 is or can comprises a wireless communication network serviced by one or more wireless communication network providers. In example embodiments, a UE (e.g., the first UE $102_1$, the second UE $102_2$) can be communicatively coupled to the wireless communication network via a network node device 104. The network node (e.g., network node device) can communicate with user equipment (UE), thus providing connectivity between the UE and the wider cellular network.

A network node can comprise a cabinet and/or other protected enclosures, an antenna mast, and multiple antennas for performing various transmission operations (e.g., MIMO operations). Network nodes can serve several cells, also called sectors, depending on the configuration and type of antenna. In example embodiments, the UE (e.g., the first UE $102_1$, the second UE $102_2$) can send and/or receive communication data via a wireless link to the network node device 104. The dashed arrow lines from the network node device 104 to the UE (e.g., the first UE $102_1$, the second UE $102_2$) represent a downlink (DL) communications and the solid arrow lines from the UE (e.g., the first UE $102_1$, the second UE $102_2$) to the network nodes (e.g., the network node device 104) represents an uplink (UL) communication.

The wireless communication system 100 can further comprise one or more communication service provider networks 106 that can facilitate providing wireless communication services to various UEs, (e.g., the first UE $102_1$, the second UE $102_2$), via the network node device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks, Wi-Fi service networks, broadband service network, enterprise networks, cloud based networks, and the like. For example, in at least one implementation, wireless communication system 100 can be or can include a large scale wireless communication network that spans various geographic areas. According to this implementation, the one or more communication service provider networks 106 can be or can include the wireless communication network and/or various additional devices and components of the wireless communication network (e.g., additional network devices and cell, additional UEs, network server devices, etc.). The network node device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation modes to facilitate wireless radio communications between devices (e.g., the UE (e.g., the first UE $102_1$, the second UE $102_2$) and the network node device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000, and so on.

For example, the wireless communication system 100 can operate in accordance with Global System for Mobile Communications (GSM), Universal Mobile Telecommunications Service (UMTS), Long Term Evolution (LTE), LTE frequency division duplexing (LTE FDD), LTE Time Division Duplexing (TDD), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-Carrier Code Division Multiple Access (MC-CDMA), Single-Carrier Code Division Multiple Access (SC-CDMA), Single-Carrier FDMA (SC-FDMA), Orthogonal Frequency Division Multiplexing (OFDM), DISCRETE FOURIER TRANSFORM SPREAD OFDM (DFT-spread OFDM) Single Carrier FDMA (SC-FDMA), FILTER BANK BASED MULTI-CARRIER (FBMC), Zero Tail DFT-spread-OFDM (ZT DFT-s-OFDM), Generalized Frequency Division Multiplexing (GFDM), Fixed Mobile Convergence (FMC), Universal Fixed Mobile Convergence (UFMC), UNIQUE WORD OFDM (UW-OFDM), Unique Word DFT-spread OFDM (UW DFT-Spread-OFDM), Cyclic Prefix OFDM CP-OFDM, resource-block-filtered OFDM, Wi Fi, WLAN, WiMax, and the like. However, various features and functionalities of the wireless communication system 100 are particularly described wherein the devices (e.g., the UEs (e.g., the first UE $102_1$, the second UE $102_2$) and the network node device 104) of the wireless communication system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to MultiCarrier (MC) or Carrier Aggregation (CA) operation of the UE. The term carrier aggregation is also called (e.g. interchangeably called) "multi-carrier system," "multi-cell operation," "multi-carrier operation," "multi-carrier" transmission and/or reception. Note that some embodiments are also applicable for Multi RAB (radio bearers) on some carriers (that is data plus speech is simultaneously scheduled).

In various embodiments, the wireless communication system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In some implementations, a transmitting node (e.g., the network node device 104 and/or one or more UEs (e.g., the first UE $102_1$, the second UE $102_2$)) can perform listen before talk in a first beam. When listen before talk completes in the first beam (or before listen before talk reaches completion) indicting the first beam is available for transmissions, the network node device 104 and/or the one or more UEs can look for additional inactive beams by performing a shortened listen before talk procedure on the other beams. The first beam and/or second beam, both determined to be inactive, can be used for transmission to one or more receivers.

Figure 2:
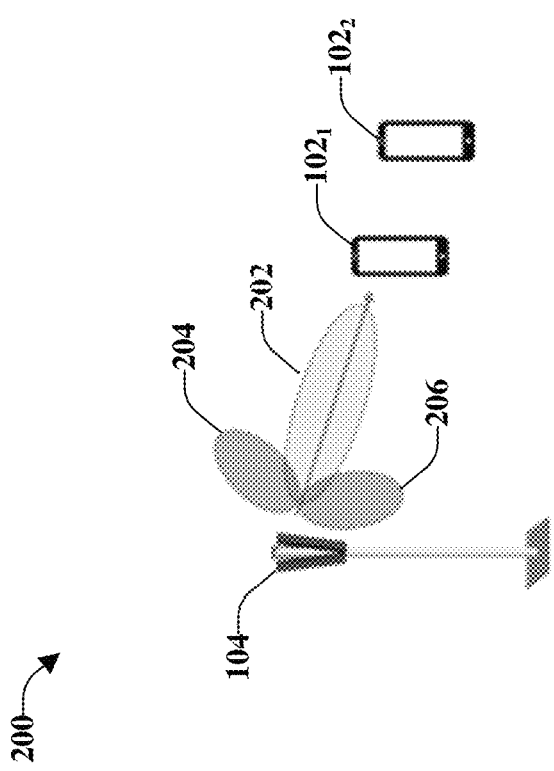
FIG. 2 illustrates an example, non-limiting, block diagram of an advanced communications network in which fast multi-beam listen before talk can be facilitated in accordance with one or more embodiments described herein.

FIG. 2 illustrates an example, non-limiting, block diagram of an advanced communications network 200 in which fast multi-beam listen before talk can be facilitated networks in accordance with one or more embodiments described herein. Repetitive description of like elements employed in other embodiments described herein is omitted for sake of brevity.

The advanced communications network 200 can comprise the network node device 104, the first UE $102_1$ and the second UE $102_2$. Although only a single network device and two UE devices are illustrated, the disclosed aspects are not limited to this implementation and any number of network devices and UE devices can be utilized in the advanced communications network 200.

As discussed herein, multi-carrier listen before talk is a procedure used by Wi-Fi and LAA to access multiple unlicensed channels. In this procedure, a node (e.g., the network node device 104, the first UE $102_1$ and the second UE $102_2$) can perform full listen before talk procedure on a primary channel (e.g., a first beam 202). If, and when, the channel is found to be inactive, the node can perform a short listen before talk procedure on other channels (e.g., a second beam 204, an n-th beam 206, or other beams, where n is an integer) to determine whether the other channels are inactive. The channels found to be inactive using the short listen before talk procedure can be used for transmission along with the first channel.

In further detail, a node (e.g., the network node device 104, the first UE $102_1$, the second UE $102_2$) can perform listen before talk in the first beam 202. The first beam 202 can be referred to as a primary beam. When listen before talk completes in the primary beam (or before listen before talk reaches completion) indicating that the first beam 202 is available for transmission, the node (e.g., the network node device 104, the first UE $102_1$, the second UE $102_2$) can look for additional inactive beams by doing a short listen before talk procedure on the other beams (e.g., the second beam 204, the n-th beam 206, and so on). The other beams can be referred to as secondary beams. The node can use the primary beam and the one or more secondary beams found inactive for its transmission to the intended receiver or receivers (e.g., the network node device 104, the first UE $102_1$ and the second UE $102_2$) using single-user or multi-user MIMO, respectively. The short listen before talk can be for a short inter-frame spacing (SIFS) period. In a non-limiting example, the SIFS period can be around 25 microseconds, or a different time interval. According to some implementations, a single back off counter can be used for the primary beam.

Additionally, or alternatively, the short listen before talk procedure on the secondary beams can be based on a full listen before talk procedure comprising multiple sensing or defer periods. For example, the transmitting node can pause or can freeze the listen before talk counter before the final defer period until the primary beam completes the full listen before talk procedure. Alternatively, the primary and secondary beams can perform the final defer period sensing jointly if the transmitter is capable of sensing on multiple beams simultaneously. A separate and independent back off can be used.

The primary and secondary beams can be selected based on receiver feedback, transmitter sensing, or a combination of the receiver feedback and transmitter sensing. In a non-limiting example, the primary beam can be associated with a single synchronization signal block (SSB), while the secondary beams correspond to SSBs with different identifiers (IDs) than the SSB of the primary beam. According to another non-limiting example, the primary and secondary beams can be associated with different CSI-RS resource configurations. In yet another non-limiting example the primary and secondary beams can be associated with a mix of SSBs and CSI-RS configurations.

In another embodiment, a node can perform listen before talk in a primary beam on a primary frequency channel. When listen before talk completes (or nears completion) in the primary beam and the primary channel, the node can look for additional channels and additional beams by using a single shot listen before talk procedure on various beam and channel combinations. The node then can use the primary and secondary channels on the primary and secondary beams found to be inactive for its transmission to the intended receiver or receivers. The primary and secondary beams and channels can be selected based on receiver feedback, transmitter sensing, or a combination of the two. Different frequency channels can be available on different beams. This can be handled by the use of bandwidth parts (BWP) where bandwidth parts not available can be turned off and not used for transmission. The listen before talk parameters used for the primary and secondary beams can be configured by the network and can include channel access priority, energy detection threshold, maximum channel occupancy time (MCOT), and so on.

The disclosed aspects are applicable to TDD equipment with a number of antenna elements capable of transmit and receive beamforming. In some implementations, each transmit beam of the equipment can have a corresponding receive beam of the same equipment with identical propagation characteristics (gain, pattern, etc.). For example, the two beams can be reciprocal. Narrowband or wideband beamforming can be employed although narrowband beamforming assumes that coexisting networks do not interfere with each other outside of the narrow band where listen before talk is used. This has implications for network synchronization and use of compatible numerology. Further, the disclosed aspects are applicable to analog, digital, and/or hybrid beamforming. The various aspects can also apply to azimuthal, elevation, and/or 3D beamforming. Beam activity and/or channel activity can be detected using energy detection or preamble detection. Cat 4 or other forms of listen before talk can be employed. Listen before talk can be performed at the transmitter end, the receiver end or at both the transmitter end and the receiver end. This can, for example, correspond to the indication of one or more beam-pair-links (BPL) corresponding to a beam at the transmitter and a beam at the intended receiver. Beam activity and/or channel activity indication can be jointly or independently determined and exchanged between the transmitter and intended receiver(s) (e.g. request to send and clear to send messages or signals).

Figure 3:
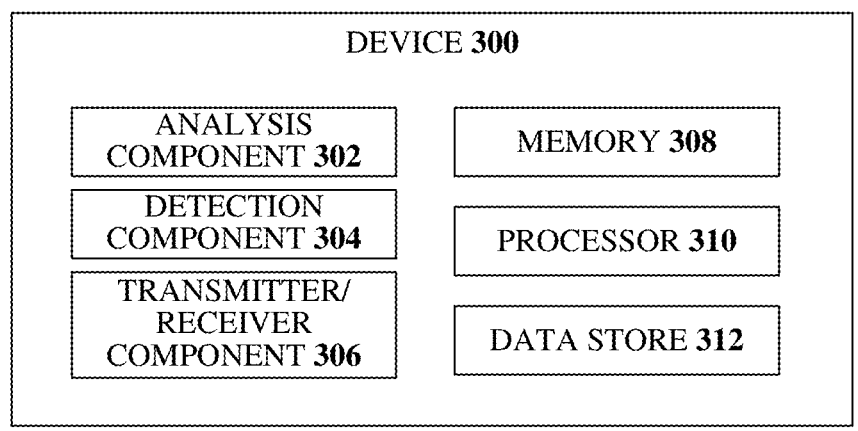
FIG. 3 illustrates an example, non-limiting, block diagram of a device configured to perform fast listen before talk in accordance with one or more embodiments described herein.

FIG. 3 illustrates an example, non-limiting, block diagram of a device 300 configured to perform fast listen before talk in accordance with one or more embodiments described herein. Aspects of devices (e.g., the device 300 and the like), systems, apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the device 300 can be any type of component, machine, system, facility, apparatus, and/or instrument that comprises a processor and/or can be capable of effective and/or operative communication with a wired and/or wireless network. Components, machines, apparatuses, systems, facilities, and/or instrumentalities that can comprise the device 300 can include network devices, base stations, tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The device 300 can be a network device (e.g., the network node device 104) and/or a user equipment device (e.g., the first UE $102_1$, the second UE $102_2$). The device 300 can comprise an analysis component 302, a detection component 304, a transmitter/receiver component 306, at least one memory 308, at least one processor 310, and at least one data store 312.

The analysis component 302 can be configured to perform listen before talk procedures in a wireless communications network. According to some implementations, the listen before talk procedures can be multi-beam listen before talk procedures. Further, the analysis component 302 can be configured to perform a first listen before talk procedure in a first beam (e.g., a primary beam) and a second listen before talk procedure in at least a second beam (e.g., a secondary beam). The first listen before talk procedure can be a full first listen before talk procedure and the second listen before talk procedure can be a shortened listen before talk procedure. For example, the first listen before talk procedure can comprise a first duration and the second listen before talk procedure can comprise a second duration, where the second duration is shorter than the first duration. In addition, the second before talk procedure (and/or and n-th or subsequent listen before talk procedures) can be initiated before completion of the first listen before talk procedure, or upon or after the completion of the first listen before talk procedure. Performing the second listen before talk procedure prior to completion of the first listen before talk procedure, can decrease channel access latency and increasing user throughputs and network capacity based on quickly finding inactive beams.

Based on a first performance of a first listen before talk procedure performed by the analysis component 302 in the first beam (e.g., the first beam 202), the detection component 304 can be configured to determine an activity or an inactivity in the first beam. The activity indicates a presence of first radio interference on the first beam. The inactivity indicates an absence of first radio interference on the first beam. The inactivity also indicates that the first beam is available for transmission.

If it is determined there is inactivity in the first beam, the analysis component 302 can initiate the second talk before procedure in at least a second beam (e.g., a secondary beam). The determination of inactivity in the first beam can be ascertained prior to completion of the first listen before talk procedure.

According to some implementations, the analysis component 302 can perform respective shortened listen before talk procedures in second beams of a set of second beams. For example, the set of second beams can be determined to be secondary beams associated with the first beam (e.g., the primary beam). The primary and/or secondary beams can be selected based on various parameters including, for example, receiver feedback, transmitter (e.g., the device 300) sensing, and/or a combination thereof.

In an example, the short listen before talk procedure performed in the second beam (or set of second beams) can be based on a full listen before talk procedure that can comprise multiple sensing and/or defer periods. For example, the analysis component 302 (or another system component) can pause or freeze a counter (e.g., a listen before talk counter) prior to a final defer period until the first scan of the primary beam complete the full listen before talk procedure. Alternatively, the first beam and second beam (or second set of beams) can perform the final defer period sensing at about the same time, provided the device 300 (e.g., the analysis component 302) is capable of sensing on multiple beams at the same time, or substantially the same time.

The transmitter/receiver component 306 can be configured to use the beams determined to be inactive (e.g., the first beam and the second beam, or set of second beams) to transmit a signal. If one or more second beams are determined to be active, the transmitter/receiver component 306 does not transmit a signal on those beams. The transmitter/receiver component 306 can use the beams determined to be inactive for transmission to an intended receiver (or more than one receiver). For example, the transmitter/receiver component 306 can use single-user MIMO for a single receiver and multi-user MIMO for more than one receiver. The transmitter/receiver component 306 can transmit the signal via a spatial channel configured to operate according to a fifth generation wireless network communication protocol.

The transmitter/receiver component 306 can be configured to transmit to, and/or receive data from other devices (e.g., other network devices, and/or other user equipment devices). Through the transmitter/receiver component 306, the device 300 can concurrently transmit and receive data, can transmit and receive data at different times, or combinations thereof. According to some implementations, the transmitter/receiver component 306 can facilitate communications between the device 300 and other devices.

In an embodiment, channel activity can be detected based on detecting energy in a receive beam. In other embodiments, if the device 300 is able to decode a preamble associated with the beam, the device 300 can determine that there is channel activity such that transmitting to the intended receiver should be halted until the activity has ceased.

The energy required to be detected for the device 300 to determine that activity is taking place can be a predetermined value that can be different based on different contexts. For instance, a wide beam can have a higher energy requirement than a narrow beam. Similarly, if a device to be communicated with is far away, a lower energy threshold can be set, while a closer device can have a higher energy threshold. The energy threshold can also vary based on the channel (e.g., frequency of the transmission), as well as based on the communication protocol and technology type (e.g., cellular, 5G, Wi-Fi, etc.).

In an embodiment, various forms of listen before talk can be employed. Each of the CCA parameters backoff counter, maximum channel occupancy time (MCOT) size, energy detection threshold, contention window maximum size may be configured jointly or independently for each of the multiple beams and or beam combinations or subsets thereof. Multi-beam listen before talk can be performed at the transmitter end, the receiver end or both. This may for example correspond to the indication of one or more beam-pair-links (BPL) corresponding to a beam at the transmitter and a beam at the intended receiver. The CCA indication may be jointly or independently determined and exchanged between the transmitter and intended receiver (e.g. request to send and clear to send messages or signals) on the basis of one or more configured BPLs in case of Multi-beam listen before talk operation.

Multi-beam listen before talk can also be performed for multiple frequency channels as in multi-channel listen before talk. In one example, the multi-beam and multi-channel listen before talk are performed independently (e.g. CCA is performed using all combinations of channels and beam/beam combinations). In another example, multi-beam and multi-channel listen before talk are performed jointly such that CCA is performed on a subset of possible combinations of channels and beams selected based on a criterion such as transmitter/receiver capabilities, performance metric, or regulatory constraints (e.g., max EIRP in a given bandwidth).

The at least one memory 308 can be operatively connected to the at least one processor 310. The at least one memory 308 can store executable instructions that, when executed by the at least one processor 310 can facilitate performance of operations. Further, the at least one processor 310 can be utilized to execute computer executable components stored in the at least one memory 308.

For example, the at least one memory 308 can store protocols associated with fast multi-beam listen before talk in advanced networks as discussed herein. Further, the at least one memory 308 can facilitate action to control communication between device 300, other network devices, and/or other user equipment devices such that the device 300 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 310 can facilitate respective analysis of information related to fast multi-beam listen before talk in advanced networks. The at least one processor 10 can be a processor dedicated to analyzing and/or generating information received, a processor that controls one or more components of the device 300, and/or a processor that both analyzes and generates information received and controls one or more components of the device 00.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node device 104) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 4:
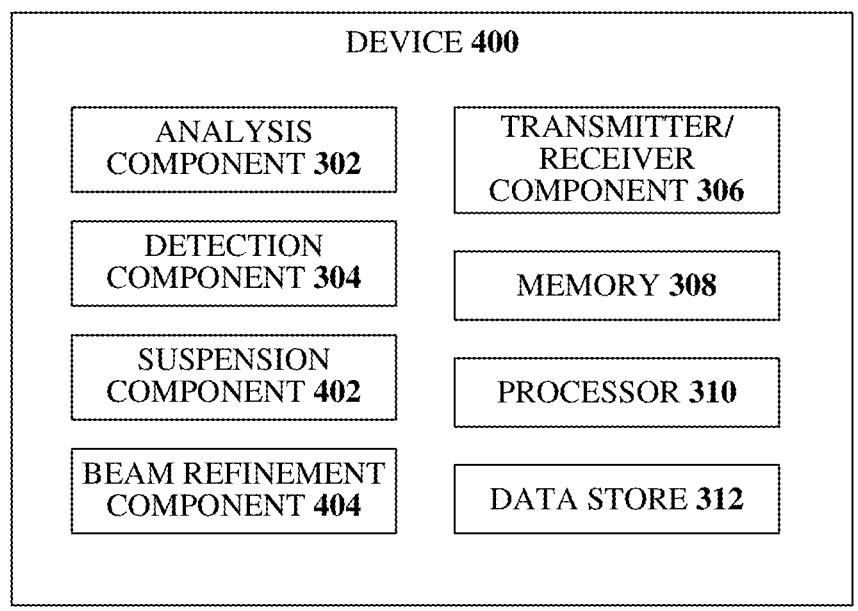
FIG. 4 illustrates another example, non-limiting, block diagram of a device configured to perform fast listen before talk in accordance with one or more embodiments described herein.

FIG. 4 illustrates another example, non-limiting, block diagram of a device 400 configured to perform fast listen before talk in accordance with one or more embodiments described herein. Repetitive description of like elements employed in other embodiments described herein is omitted for sake of brevity. The device 400 can comprise one or more of the components and/or functionality of the device 300 and vice versa.

The device can comprise a suspension component 402 that can be configured to suspend additional searches for inactive beams upon or after the detection component 304 determines that the first beam and the second beam are inactive. For example, the suspension component 402 can, at least temporarily, suspend additional searches for activities on additional beams other than the first beam and the second beam.

Accordingly, the device 400 is not continuously looking for inactive beams. For example, from a co-existence perspective continuously looking for inactive beam can create an excessive amount of interference. The term "co-existence" can mean there are multiple nodes (e.g., network devices, user equipment devices) in the vicinity and those nodes are also looking for beams. Thus, if the nodes (including the device 400) are constantly looking for inactive beams, additional (unnecessary) congestion can be created in the wireless network. This is because one or more nodes might find slivers of inactively between a lot of activity, then one or more nodes could attempt to transmit and there will be a collision or back off, which can trigger more congestion.

According to some implementations, various conditions can be associated with the suspension component 402. For example, if a beam (e.g., a secondary beam) is determined to be inactive, the analysis component 302 can quit searching. Thus, if a secondary beam is inactive, there might be some restrictions on further search for other beams. Further, finding one secondary beam to be active can indicate that there might be activity on other beams (e.g., other secondary beams).

In accordance with some non-limiting implementations, the primary beam can be associated with a single synchronization signal block (SSB), and the secondary beams can correspond to SSBs with different identifiers (IDs) than the SSB of the primary beam. According to another non-limiting implementation, the primary and secondary beams can be associated with different CSI-RS resource configurations. In yet another non-limiting implementation, the primary and secondary beams can be associated with a mixture of SSBs and CSI-RS configurations.

Additionally, or alternatively, the device 400 can comprise a beam refinement component 404 that can be configured to perform beam refinement. For example, the first beam or primary beam can be a broad beam and the second beam or secondary beam (or multiple beams) can be narrow beam(s).

The beam refinement component 404 can detect a first direction of interference based on a coarse scan of first radio interference during the first listen before talk procedure performed on the broad beam. Further, the transmitter/receiver component 306 can transmit the signal via the narrow beam. For example, the transmitter/receiver component 306 can transmit the signal via the second beam in a second direction different from the first direction of interference.

Figure 5:
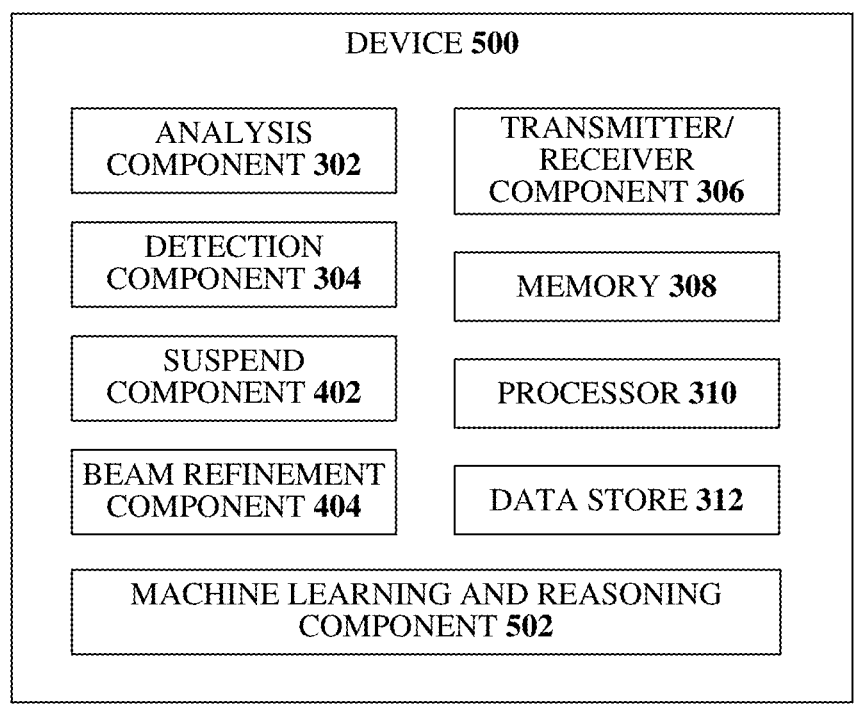
FIG. 5 illustrates an example, non-limiting, device that employs automated learning to facilitate one or more of the disclosed aspects in accordance with one or more embodiments described herein.

FIG. 5 illustrates an example, non-limiting, device 500 that employs automated learning to facilitate one or more of the disclosed aspects in accordance with one or more embodiments described herein. Repetitive description of like elements employed in other embodiments described herein is omitted for sake of brevity. The device 500 can comprise one or more of the components and/or functionality of the device 300, the device 400, and vice versa.

As illustrated, the device 500 can comprise a machine learning and reasoning component 502 that can be utilized to automate one or more of the disclosed aspects. The machine learning and reasoning component 502 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 502 can employ principles of probabilistic and decision theoretic inference. Additionally, or alternatively, the machine learning and reasoning component 502 can rely on predictive models constructed using machine learning and/or automated learning procedures. Logic-centric inference can also be employed separately or in conjunction with probabilistic methods.

The machine learning and reasoning component 502 can infer activity and/or inactivity on beams, beams that should be classified as primary or secondary, how to select beams, and so on, by obtaining knowledge about the possible actions and knowledge about historical information (e.g., which beams are usually inactive, which beams are usually active, which beams are inactive based on inactivity of another beam), implementation details, wireless network configuration details, and so on. Based on this knowledge, the machine learning and reasoning component 502 can make an inference based on which actions to implement, which beams to check for activity/inactivity, which secondary beams should be checked after checking a primary beam, whether to suspend a search for additional inactive beams, or combinations thereof.

As used herein, the term "inference" refers generally to the process of reasoning about or inferring states of a system, a component, a module, an environment, and/or devices from a set of observations as captured through events, reports, data and/or through other forms of communication. Inference can be employed to identify a specific context or action related to determine activity and/or inactivity of one or more beams, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with implementing fast multi-beam listen before talk procedures) can employ various artificial intelligence-based schemes for carrying out various aspects thereof. For example, a process for determining if a particular beam should be search, if a search should be temporarily suspended, and so on, can be enabled through an automatic classifier system and process.

A classifier is a function that maps an input attribute vector, x=(x1, x2, x3, x4, xn), to a confidence that the input belongs to a class. In other words, f(x)=confidence (class). Such classification can employ a probabilistic and/or statistical-based analysis (e.g., factoring into the analysis utilities and costs) to provide a prognosis and/or infer one or more actions that should be employed to determine the beams on which a listen before talk should be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing network channel behavior, by receiving extrinsic information, and so on). For example, SVM's can be configured through a learning or training phase within a classifier constructor and feature selection module. Thus, a classifier(s) can be used to automatically learn and perform a number of functions, including but not limited to determining, according to a predetermined criterion, when to implement one or more listen before talk procedures, which listen before talk procedures to implement (e.g., a full listen before talk procedure, a shortened listen before talk procedure), timing of initiation of a shorted listen before talk procedure when a primary beam is determined to be inactive, and so forth. The criteria can include, but is not limited to, similar channel information, historical information, and so forth.

Additionally, or alternatively, an implementation scheme (e.g., a rule, a policy, and so on) can be applied to control and/or regulate listen before talk procedures and resulting actions, inclusion of a group of channels to search, and so forth. In some implementations, based upon a predefined criterion, the rules-based implementation can automatically and/or dynamically interpret results of various listen before talk procedures. In response thereto, the rule-based implementation can automatically interpret and carry out functions associated with the various listen before talk procedures by employing a predefined and/or programmed rule(s) based upon any desired criteria.

Figure 6:
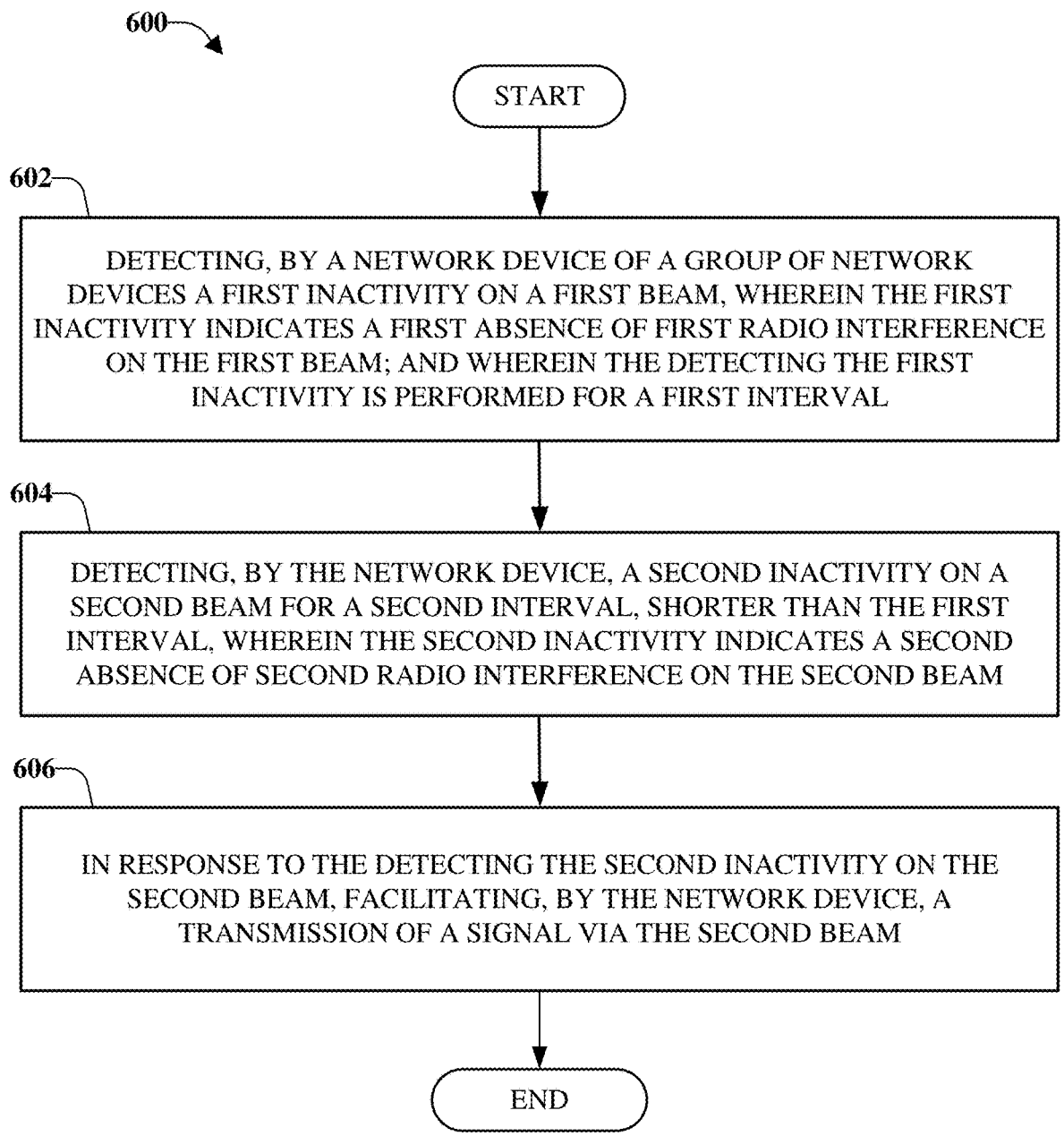
FIG. 6 illustrates a flow diagram of an example, non-limiting, computer-implemented method that facilitates fast multi-beam listen before talk in advanced networks in accordance with one or more embodiments described herein.

FIG. 6 illustrates a flow diagram of an example, non-limiting, computer-implemented method 600 that facilitates fast multi-beam listen before talk in advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device (e.g., a network device, a user equipment device) comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a device operatively coupled to one or more processors, can detect a first inactivity on a first beam (e.g., via the detection component 304). The first inactivity can indicate an absence of first radio interference on the first beam. Further, detecting the first inactivity can be performed for a first interval.

A second inactivity can be detected on a second beam for a second interval, at 604 of the computer-implemented method 600 (e.g., via the detection component 304). The second interval can be shorter than the first interval. The second inactivity can indicate an absence of second radio interference on the second beam. In response to detecting the second inactivity on the second beam, at 606 of the computer-implemented method 600, the device can facilitate a transmission of a signal via the second beam (via the transmitter/receiver component 306).

According to an implementation, detecting the first inactivity (at 602) can comprise performing a listen before talk procedure in the first beam. Further to this implementation, detecting the second inactivity (at 604) can comprise initiating, by the device, a short listen before talk procedure in the second beam upon completion of the listen before talk procedure in the first beam. Alternatively, detecting the second inactivity can comprise initiating a short listen before talk procedure in the second beam before completion of the listen before talk procedure in the first beam.

Figure 7:
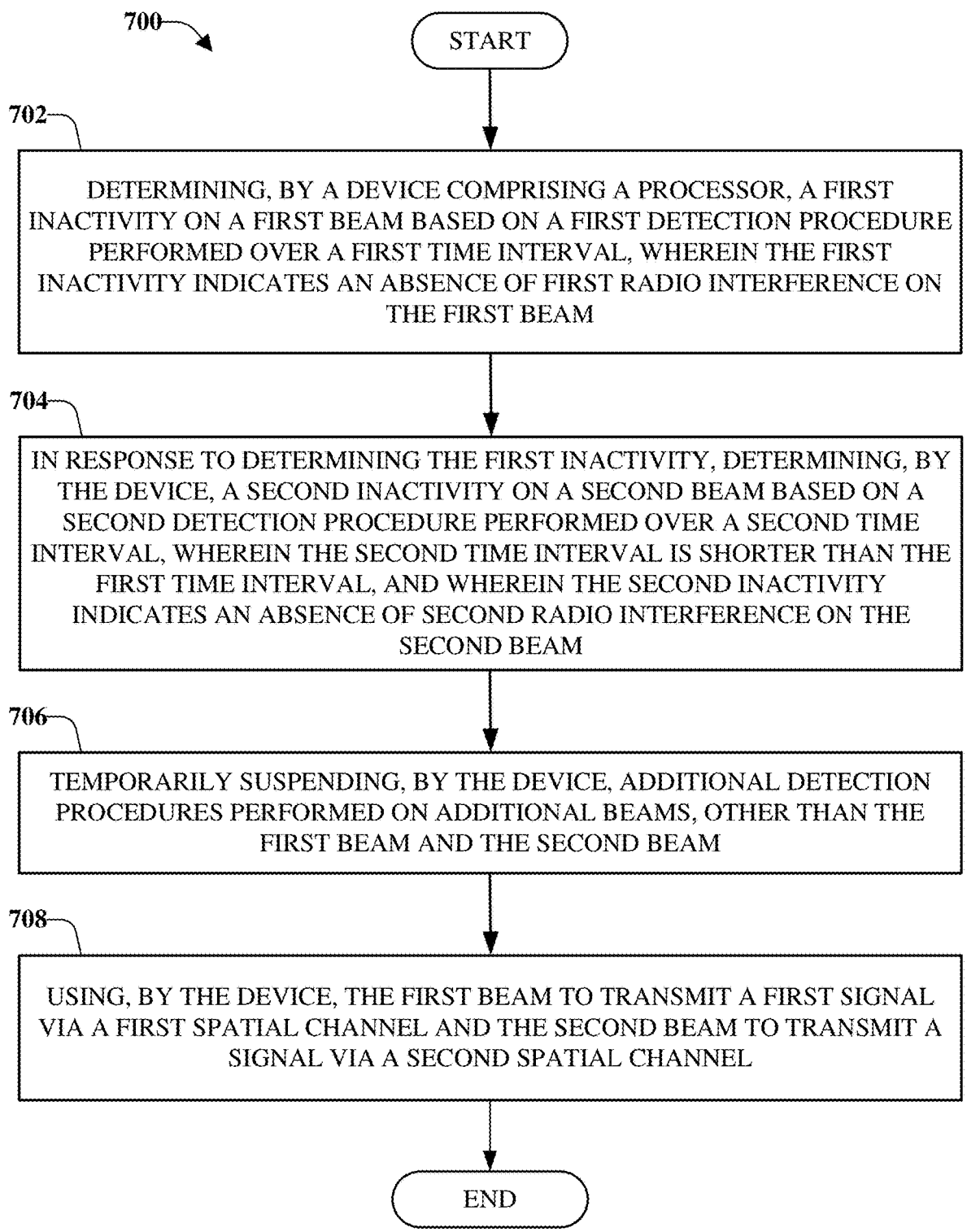
FIG. 7 illustrates a flow diagram of an example, non-limiting, computer-implemented method that facilitates fast multi-beam listen before talk in advanced networks in accordance with one or more embodiments described herein.

FIG. 7 illustrates a flow diagram of an example, non-limiting, computer-implemented method 700 that facilitates fast multi-beam listen before talk in advanced networks in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device (e.g., a network device, a user equipment device) comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700, a first inactivity on a first beam can be determined based on a first detection procedure performed over a first time interval (e.g., via the detection component 304). The first inactivity can indicate an absence of first radio interference on the first beam. In response to determining the first inactivity, a second inactivity on a second beam can be determined at 704 of the computer-implemented method 700 (e.g., via the detection component 304). The second inactivity can be determined based on a second detection procedure performed over a second time interval. Further, the second time interval can be shorter than the first time interval. The second inactivity can indicate an absence of second radio interference on the second beam. In addition, the second inactivity on the second beam can be initiated prior to a completion of the first detection procedure.

Additional detection procedures performed on additional beams, other than the first beam and the second beam, can be temporarily suspended at 706 of the computer-implemented method 700 (e.g., via the suspension component 402). For example, the search for additional beams can be suspended in order to relieve network traffic congestion.

Further, at 708 of the computer-implemented method 700, the first beam can be used to transmit a first signal via a first spatial channel and the second beam can be used to transmit a signal via a second spatial channel (e.g., via the transmitter/receiver component 306).

Figure 8:
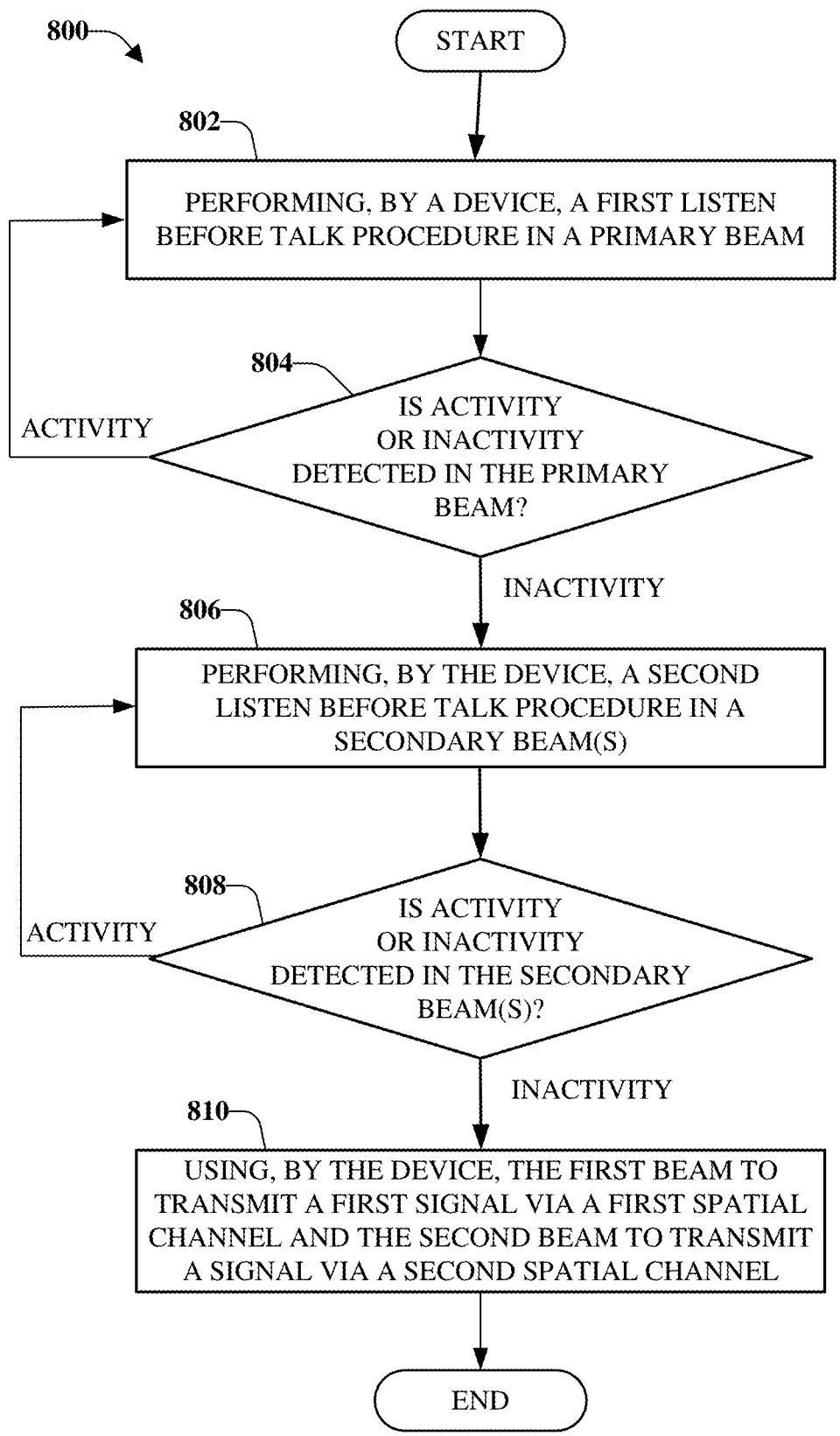
FIG. 8 illustrates a flow diagram of an example, non-limiting, computer-implemented method that facilitates fast multi-beam listen before talk in advanced networks in accordance with one or more embodiments described herein.

FIG. 8 illustrates a flow diagram of an example, non-limiting, computer-implemented method 800 that facilitates fast multi-beam listen before talk in advanced networks in accordance with one or more embodiments described herein. Repetitive description of like elements employed in other embodiments described herein is omitted for sake of brevity.

In some implementations, a system comprising a processor can perform the computer-implemented method 800 and/or other methods discussed herein. In other implementations, a device (e.g., a network device, a user equipment device) comprising a processor can perform the computer-implemented method 800 and/or other methods discussed herein. In other implementations, a machine-readable storage medium, can comprise executable instructions that, when executed by a processor, facilitate performance of operations, which can be the operations discussed with respect to the computer-implemented method 800 and/or other methods discussed herein. In further implementations, a computer readable storage device comprising executable instructions that, in response to execution, cause a system comprising a processor to perform operations, which can be operations discussed with respect to the computer-implemented method 800 and/or other methods discussed herein.

A first listen before talk procedure can be performed in a primary beam, at 802 of the computer-implemented method 800 (e.g., via the analysis component 302). A determination is made, at 804 of the computer-implemented method 800, whether activity or inactivity is detected in the primary beam (e.g., via the detection component 304). The activity indicates a presence of a first radio interference on the first beam. The inactivity indicates an absence of first radio interference on the first beam.

If activity is detected in the first beam, the computer-implemented method 800 can return to 802 and another listen before talk procedure can be performed in another primary beam. It is to be understood that the determination of whether activity or inactivity is present in a primary beam and scanning of another primary beam can be recursive, such that any number of primary beams can be scanned until a beam is found to be inactive or until all primary beams (or a defined number of primary beams) are scanned, whether or not the primary beams are active or inactive (e.g., multiple inactive primary beams can be found).

Alternatively, if inactivity is detected in the first beam, at 806 of the computer-implemented method 800 a second listen before talk procedure can be performed in a secondary beam (e.g., via the analysis component 302). The primary and secondary beams can be selected based on various criteria including, but not limited to, receiver feedback and/or transmitter sensing. According to an implementation, the primary beam can be associated with a single SSB and the secondary beam(s) can correspond to SSBs with different IDs than the SSB of the primary beam. In accordance with some implementations, the primary and secondary beams can be associated with different CSI-RS resource configurations. In yet another implementation, the primary and secondary beams can be associated with a mix of SSBs and CSI-RS configurations.

At 808 of the computer-implemented method 800, another determination can be made whether activity or inactivity is detected in the secondary beam (e.g., via the detection component 304). The activity indicates a presence of a second radio interference on the second beam. The inactivity indicates an absence of second radio interference on the second beam. Subsequent secondary beams (e.g., n-th beams, third secondary beams, fourth secondary beams, fifth secondary beams, and so on) can be analyzed in a similar manner.

If activity is detected in the second beam, the computer-implemented method 800 can return to 806 and another listen before talk procedure can be performed in another secondary beam. It is to be understood that the determination of whether activity or inactivity is present in a second beam and scanning of another second beam can be recursive, such that any number of secondary beams can be scanned until a beam is found to be inactive. Alternatively, the scanning of another second beam can be performed until all secondary beams are scanned or based on a determination that no further additional secondary beams need to be scanned.

At 810 of the computer-implemented method 800, the first beam can be used to transmit a first signal via a first spatial channel and the second beam can be used to transmit a signal via a second spatial channel (e.g., via the transmitter/receiver component 306).

While, for purposes of simplicity of explanation, some methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating channel state information determination and reporting in wireless communication systems for advanced networks are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Multiple Input, Multiple Output (MIMO) systems can significantly increase the data carrying capacity of wireless systems. For these reasons, MIMO is an integral part of the $3^{rd}$ and $4^{th}$ generation wireless systems. 5G systems can also employ MIMO systems, also called massive MIMO systems (e.g., hundreds of antennas at the Transmitter side and/Receiver side). In an example of a ($N_t$,$N_r$) system, where $N_t$ denotes the number of transmit antennas and $N_r$ denotes the receive antennas, and where N is an integer, the peak data rate multiplies with a factor of $N_t$ over single antenna systems in rich scattering environment.

Described herein are systems, methods, articles of manufacture, and other embodiments or implementations that can facilitate fast multi-beam listen before talk in advanced networks. Facilitating de fast multi-beam listen before talk in advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
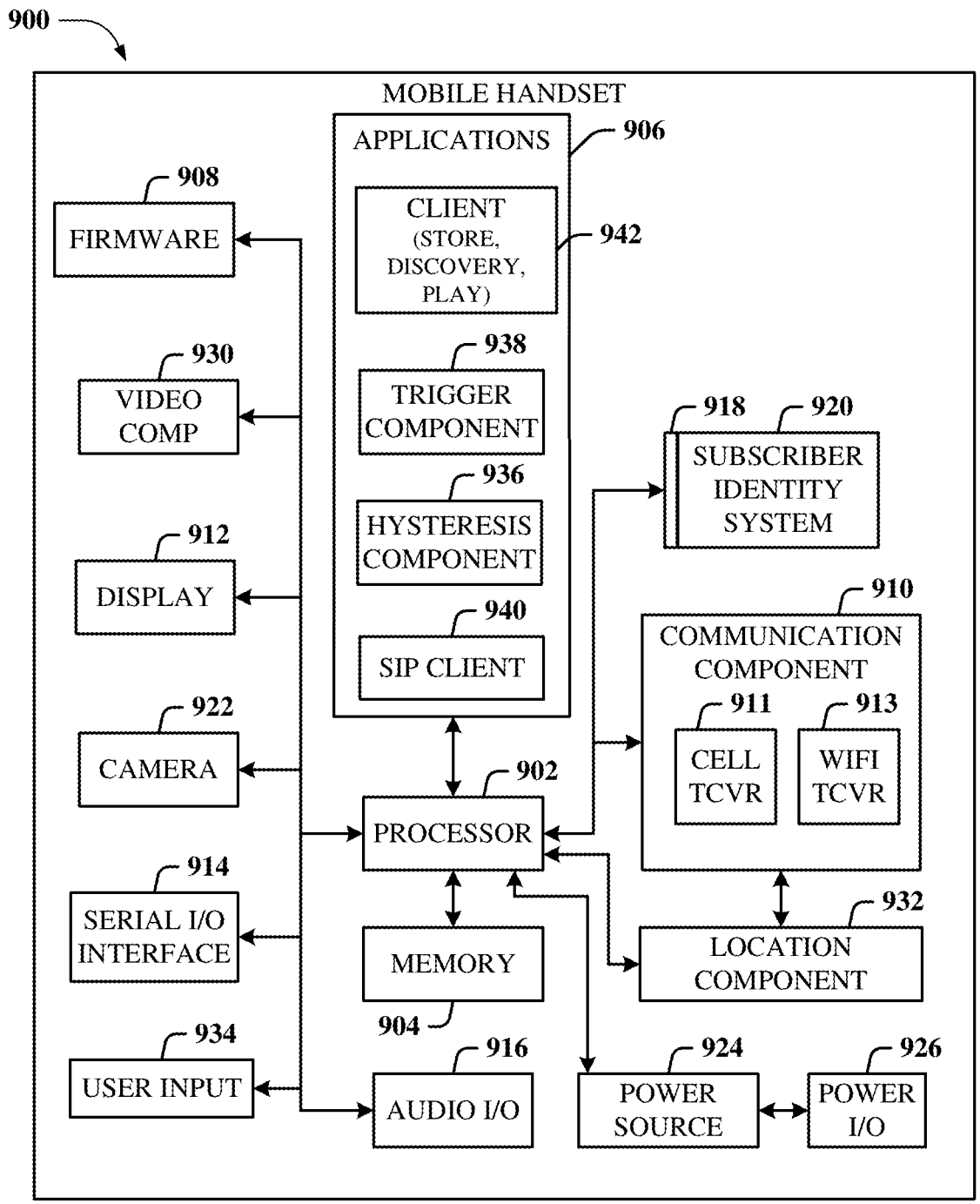
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
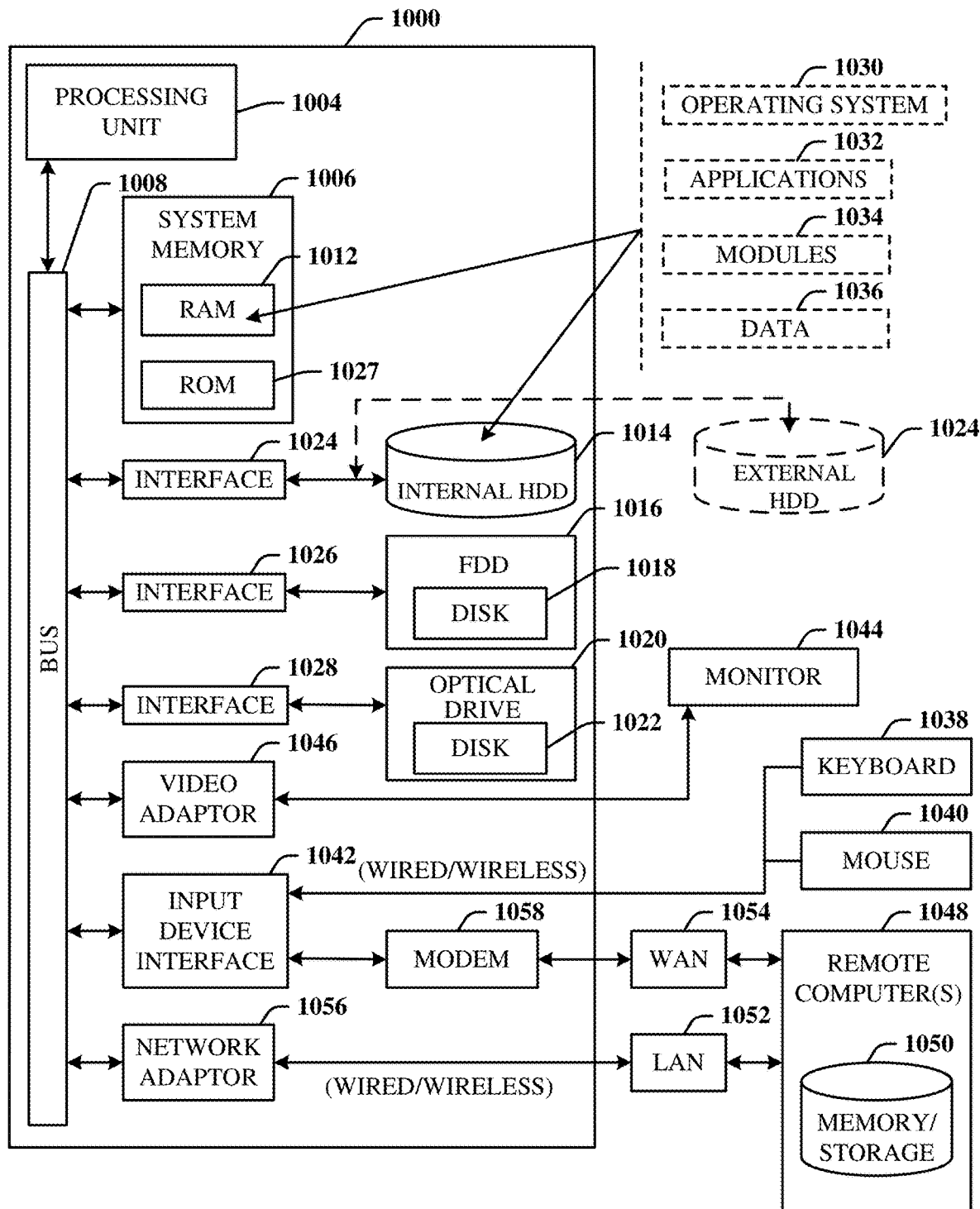
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., Enhanced Integrated Drive Electronics (EIDE), Serial Advanced Technology Attachment (SATA)), which internal hard disk drive 1014 can also be configured for external use in a suitable chassis (not shown), a magnetic Floppy Disk Drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, Wireless Fidelity (Wi-Fi), Global System for Mobile Communications (GSM), Universal Mobile Telecommunications System (UMTS), Worldwide Interoperability for Microwave Access (WiMAX), Enhanced General Packet Radio Service (enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used, or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   detecting, by a network device of a group of network devices, a first inactivity on a first beam, wherein the first inactivity indicates a first absence of first radio interference on the first beam, and wherein the detecting the first inactivity is performed for a first interval, wherein the network device comprises a processor;
   detecting, by the network device, a second inactivity on a second beam for a second interval, shorter than the first interval, wherein the second inactivity indicates a second absence of second radio interference on the second beam; and
   in response to detecting the second inactivity on the second beam, facilitating, by the network device, a transmission of a signal via the second beam.

2. The method of claim 1, wherein detecting the first inactivity comprises performing, by the network device, a listen before talk procedure in the first beam.

3. The method of claim 2, wherein detecting the second inactivity comprises initiating a shortened listen before talk procedure in the second beam before completion of the listen before talk procedure in the first beam.

4. The method of claim 1, wherein facilitating the transmission of the signal comprises facilitating the transmission of the signal to a single user device.

5. The method of claim 1, wherein facilitating the transmission of the signal comprises facilitating the transmission of the signal to a group of user devices.

6. The method of claim 1, further comprising facilitating multi-channel operation based on use of a shortened listen before talk procedure for a second channel and the second beam.

7. The method of claim 1, further comprising:
   detecting, by the network device, an n-th inactivity on an n-th beam for an n-th interval, shorter than the first interval, wherein the n-th inactivity indicates an n-th absence of an n-th radio interference on the n-th beam, and wherein n is an integer; and
   in response to detecting the n-th inactivity on the n-th beam, facilitating, by the network device, an n-th transmission of an n-th signal via the n-th beam.

8. The method of claim 1, wherein detecting the first inactivity comprises determining an interference direction based on a coarse scanning with the first beam.

9. The method of claim 8, wherein the first beam is a broad beam, and wherein the second beam is a narrow beam.

10. The method of claim 1, wherein the first beam is a primary beam, and wherein the second beam is a secondary beam.

11. The method of claim 1, wherein the first beam is a narrow beam and the second beam is a broad beam.

12. The method of claim 1, wherein facilitating the transmission of the signal via the second beam comprises facilitating the transmission of the signal via a spatial channel configured to operate according to a fifth generation wireless network communication protocol.

13. A device, comprising:
   a processor; and
   a memory that stores executable instructions that, when executed by the processor, facilitate performance of operations, comprising:
      determining a first inactivity in a first beam based on a first performance of a first listen before talk procedure in the first beam, wherein the first inactivity indicates an absence of first radio interference on the first beam, and wherein the first listen before talk procedure comprises a first duration;
      based on determining the first inactivity, analyzing a presence of an activity in a second beam based on a second performance of a second listen before talk procedure in the second beam, wherein the second listen before talk procedure comprises a second duration shorter than the first duration; and
      based on determining a lack of the presence of the activity in the second beam, transmitting a signal via the second beam.

14. The device of claim 13, wherein analyzing the presence of the activity in the second beam is performed after completion of the determining the first inactivity in the first beam.

15. The device of claim 13, wherein analyzing the presence of the activity in the second beam is performed prior to completion of the determining the first inactivity in the first beam.

16. The device of claim 13, wherein the first beam is a broad beam based on a synchronization signal block, wherein the second beam is a narrow beam based on a channel state information resource signal, and wherein the operations further comprise:
   performing beam refinement comprising detecting a first direction of interference based on a coarse scan of first radio interference during the first listen before talk procedure performed on the broad beam, and
   wherein transmitting the signal via the narrow beam comprises transmitting the signal via the second beam in a second direction different from the first direction of interference.

17. The device of claim 13, wherein transmitting the signal via the second beam comprises transmitting the signal via a spatial channel configured to operate according to a fifth generation wireless network communication protocol.

18. A non-transitory machine-readable medium, comprising executable instructions that, when executed by a processor of a mobile device, facilitate performance of operations, comprising:
   determining a first inactivity on a first beam based on a first detection procedure performed over a first time interval, wherein the first inactivity indicates a first absence of first radio interference on the first beam;
   in response to determining the first inactivity, determining a second inactivity on a second beam based on a second detection procedure performed over a second time interval, wherein the second time interval is shorter than the first time interval, and wherein the second inactivity indicates a second absence of second radio interference on the second beam; and
   using the first beam to transmit a first signal via a first spatial channel and the second beam to transmit a signal via a second spatial channel.

19. The non-transitory machine-readable medium of claim 18, wherein determining the second inactivity on the second beam is initiated prior to a completion of the first detection procedure.

20. The non-transitory machine-readable medium of claim 18, wherein the operations further comprise:
   after determining the second inactivity on the second beam, temporarily suspending additional detection procedures performed on additional beams, other than the first beam and the second beam.

* * * * *